(12) United States Patent
Hosoi

(10) Patent No.: US 6,758,201 B2
(45) Date of Patent: Jul. 6, 2004

(54) FUEL INJECTION CONTROL SYSTEM FOR INTERNAL COMBUSTION ENGINE

(75) Inventor: Shigehito Hosoi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 104 days.

(21) Appl. No.: 10/264,011

(22) Filed: Oct. 4, 2002

(65) Prior Publication Data

US 2003/0070666 A1 Apr. 17, 2003

(30) Foreign Application Priority Data

Oct. 15, 2001 (JP) .................................. 2001-316795

(51) Int. Cl.[7] .......................... F02D 41/14; F02D 19/06
(52) U.S. Cl. ...................... 123/679; 123/1 A; 123/672
(58) Field of Search ............................... 123/1 A, 494, 123/575, 672, 679, 693, 694

(56) References Cited

U.S. PATENT DOCUMENTS

| | | | | |
|---|---|---|---|---|
| 4,967,714 A | * | 11/1990 | Inoue | 123/694 |
| 4,986,241 A | * | 1/1991 | Inoue et al. | 123/1 A |
| 5,090,389 A | * | 2/1992 | Oota | 123/1 A |
| 5,094,208 A | * | 3/1992 | Adam et al. | 123/1 A |
| 5,178,121 A | * | 1/1993 | Kitajima et al. | 123/694 |
| 5,255,661 A | * | 10/1993 | Nankee et al. | 123/672 |
| 5,400,762 A | * | 3/1995 | Fodale et al. | 123/674 |
| 5,970,968 A | * | 10/1999 | Davis | 123/694 |
| 6,016,796 A | * | 1/2000 | Dalton | 123/1 A |

FOREIGN PATENT DOCUMENTS

JP          56-98540          8/1981

* cited by examiner

*Primary Examiner*—Tony M. Argenbright
(74) *Attorney, Agent, or Firm*—Foley & Lardner LLP (57) ABSTRACT

A fuel injection control system for an internal combustion engine is capable of expanding a correction allowable range employed in correcting a fuel injection quantity when refueling is detected. The fuel injection control system estimates a fuel property of fuel injected into the internal combustion engine after the correction allowable range is expanded and sets the correction allowable range on the basis of the estimated fuel property.

17 Claims, 6 Drawing Sheets

FUEL INJECTION CONTROL SYSTEM FOR INTERNAL COMBUSTION ENGINE

BACKGROUND OF THE INVENTION

The present invention relates to a fuel injection control system for an internal combustion engine, and more particularly to a fuel injection control system which is arranged to detect an alcohol concentration of fuel and to utilize the detection result of the alcohol concentration in fuel injection control.

Japanese Patent Provisional Publication No. 56-98540 discloses an engine control method which detects an alcohol concentration of fuel using an alcohol concentration sensor and to control a fuel injection quantity according to the detected alcohol concentration.

SUMMARY OF THE INVENTION

However, such a sensor for detecting an alcohol concentration is generally expensive. Further, there is a possibility that a basic injection pulse width indicative of a fuel injection quantity is varied to 160% over a correction allowable range for aging and the like when an alcohol concentration of fuel is largely varied. In such a case that the alcohol concentration is largely varied, the fuel injection control limited by the correction allowable range may not accurately control the fuel injection quantity.

It is therefore an object of the present invention to provide a fuel injection control system which is capable of detecting a fuel property of alcohol blended fuel, particularly an alcohol concentration in the fuel without employing additional parts such as an alcohol concentration sensor.

It is another object of the present invention to provide a fuel injection control system which is capable of executing a proper fuel injection control according to a fuel property of fuel.

An aspect of the present invention resides in a fuel injection control system of an internal combustion engine. This fuel injection control system comprising: a control unit which is configured to calculate a basic fuel injection quantity from an engine operating condition, to calculate an output fuel injection quantity by correcting the basic fuel injection quantity so as to bring an actual air-fuel ratio closer to a target air-fuel ratio adapted to the engine operating condition, to detect whether a fuel property of fuel for the internal combustion engine is varied, to expand a correction allowable range employed in correcting the basic fuel injection quantity when the fuel property is varied, and to estimate the fuel property by temporally varying the output fuel injection quantity after the correction allowable range is expanded and by detecting a behavior of the air-fuel ratio after the output fuel injection quantity is varied.

Another aspect of the present invention resides in a fuel injection control system for an internal combustion engine. This system comprises a control unit which is configured to calculate a basic fuel injection quantity from an engine operating condition, to calculate an output fuel injection quantity by correcting the basic fuel injection quantity so as to bring an actual air-fuel ratio into a target air-fuel ratio adapted to the engine operating condition, to detect whether refueling is executed, to expand a correction allowable range employed in correcting the basic fuel injection quantity when the refueling is detected, to estimate a fuel property of fuel injected into the internal combustion engine after the correction allowable range is expanded, and to set the correction allowable range on the basis of the estimated fuel property.

A further another aspect of the present invention resides in a method of executing a fuel injection control of an internal combustion engine, which method comprises an operation of calculating a basic fuel injection quantity from an engine operating condition, an operation of calculating an output fuel injection quantity to bring an actual air-fuel ratio closer to a target air-fuel ratio adapted to the engine operating condition by correcting the basic fuel injection quantity, an operation of detecting whether a fuel property of fuel for the internal combustion engine is varied, an operation of expanding a correction allowable range employed in correcting the basic fuel injection quantity when the fuel property is varied, and an operation of estimating the fuel property by temporally varying the output fuel injection quantity after the correction allowable range is expanded and by detecting a behavior of the air-fuel ratio after the output fuel injection quantity is varied.

The other objects and features of this invention will become understood from the following description with reference to the accompanying drawings.

DETAILED DESCRIPTION OF THE INVENTION

Referring to FIGS. 1 through 5, there is shown a first embodiment of a fuel injection control system for an internal combustion engine in accordance with a present invention.

Figure 1:
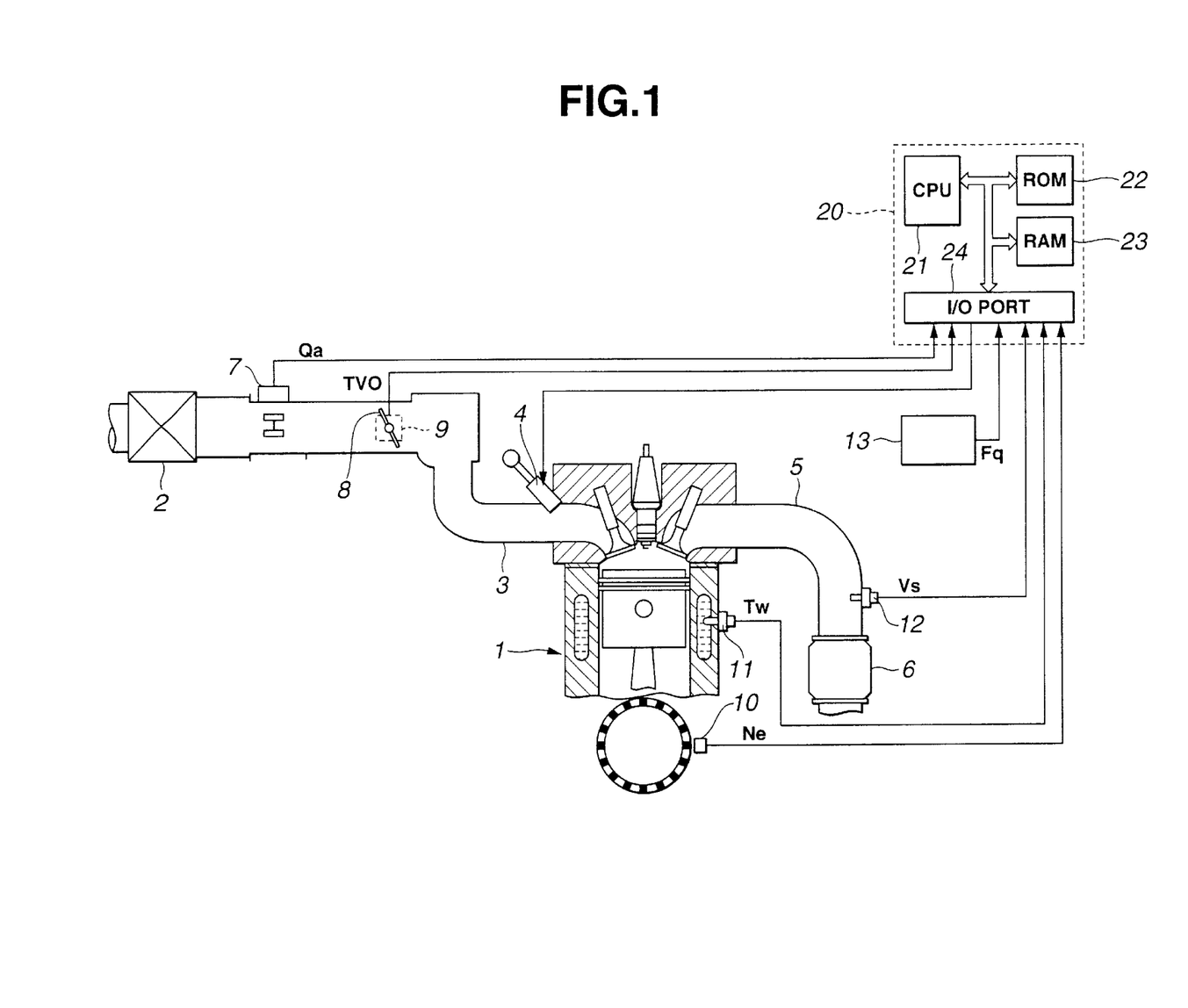
FIG. 1 is a diagram of an engine system comprising a fuel injection control system of a first embodiment according to the present invention.

As shown in FIG. 1, the internal combustion engine installed in a vehicle comprises an engine body 1, an intake passage 3 and an exhaust passage 5. An end of intake passage 3 is connected to engine body 1, and an air cleaner 2 is connected to the other end of intake passage 3. Intake air is inducted from air cleaner 2 through intake pipe 3 into engine body 1. A throttle valve 8 is provided in intake passage 3 downstream of air cleaner 2. A quantity of the intake air is controlled by throttle valve 8 and is distributed to each cylinder of engine body 1. Further, a fuel injector 4 is disposed at each intake port for each cylinder in intake passage 3. Fuel injector 4 is of an electrically operated type including a solenoid and injects a quantity of fuel according to the intake air quantity.

Exhaust passage 5 is connected to exhaust ports of engine body 1. A three-way catalytic converter 6 is disposed in exhaust passage 5. Three-way catalytic converter 6 oxidizes carbon monoxide (CO) and hydrocarbon (HC) and deoxidizes nitrogen oxide (NOx) under a stoichiometric air-fuel ratio condition.

An electronic control unit (ECU) 20 is an integrated controller and comprises CPU 21, ROM 22, RAM 23 and I/O port 24, as shown in FIG. 1.

ECU 20 is connected to an airflow meter 7 for detecting an intake air quantity Qa and outputting a detection signal indicative of intake air quantity Qa, a throttle sensor 9 for detecting an opening degree TVO of throttle valve 8 and outputting a detection signal indicative of opening degree TVO, a crank angle sensor 10 for detecting an engine speed Ne (a unit crank angle signal and a reference crank angle signal) and outputting a detection signal indicative of engine speed Ne, a water temperature sensor 11 for detecting a temperature Tw of engine coolant and outputting a detection signal indicative of temperature Tw, oxygen sensor 12 for detecting an oxygen concentration Vs in exhaust gas and a fuel residual quantity detector 13 for detecting a residual fuel quantity Fq in a fuel tank. Therefore, ECU 20 receives detection signals from the above-discussed sensing means 7, 9, 10, 11, 12 and 13, respectively.

ECU 20 calculates a fuel injection quantity on the basis of the detection signals and outputs a control signal indicative of the calculated fuel injection quantity to fuel injector 4 so as to bring a combustion air-fuel ratio of the engine closer to a target air-fuel ratio according to the engine operating condition.

In the fuel injection quantity calculation routine, ECU 20 calculates a basic injection pulse width Tp on the basis of intake air quantity Qa and engine speed Ne, using the following expression (1).

$$Tp = K \times Qs/Ne, \qquad (1)$$

where K is a constant.

Further, ECU 20 calculates an output injection pulse width Ti by correcting basis injection pulse with Tp using the following expression (2).

$$Ti = Tp \times \alpha + Ts, \qquad (2)$$

where Ts is an invalid injection time, α is a correction factor and includes a feedback correction factor derived by executing a feedback correction on the basis of the detection signal Vs of oxygen sensor 12 and a learning correction factor employed for compensating an offset of the basic air-fuel ratio due to parameters relating to aging of fuel injector 4 and a control performance of the fuel property. This calculation process of ECU 20 corresponds to fuel injection quantity correcting means.

ECU 20 has a function of troubleshooting of a fuel injection system and therefore comprises a limiter of the correction factor α. A correction allowable range of this limiter is set at a total of variations in parts of the fuel injection system, such as fuel injector 4, airflow meter 7, and a pressure regulator and performance changes of the system due to aging. Preferably, the correction allowable range is set at a range of ±40~50%. Under this setting of the limiter, when ECU 20 executes a correction over the range −40~+40%, ECU 20 determines that an abnormality in the fuel injection system is occurred. By this setting of the correction allowable range of the limiter, it becomes possible to maintain the fuel injection quantity at a proper value throughout extended period of use. Actually, the feedback correction factor and the learning correction factor are independently set by each limiter. Herein, in order to facilitate the understanding, it was discussed such that the correction factor is the sum of the feedback correction factor and the learning correction factor stored in the respective limiters.

With reference to flowcharts of FIGS. 2 and 3, there will be discussed the fuel property estimating routine executed by ECU 20. Herein, on the precondition that the vehicle uses an alcohol blended fuel, ECU 20 estimates alcohol concentration Ca of fuel as a fuel property.

Figure 2:
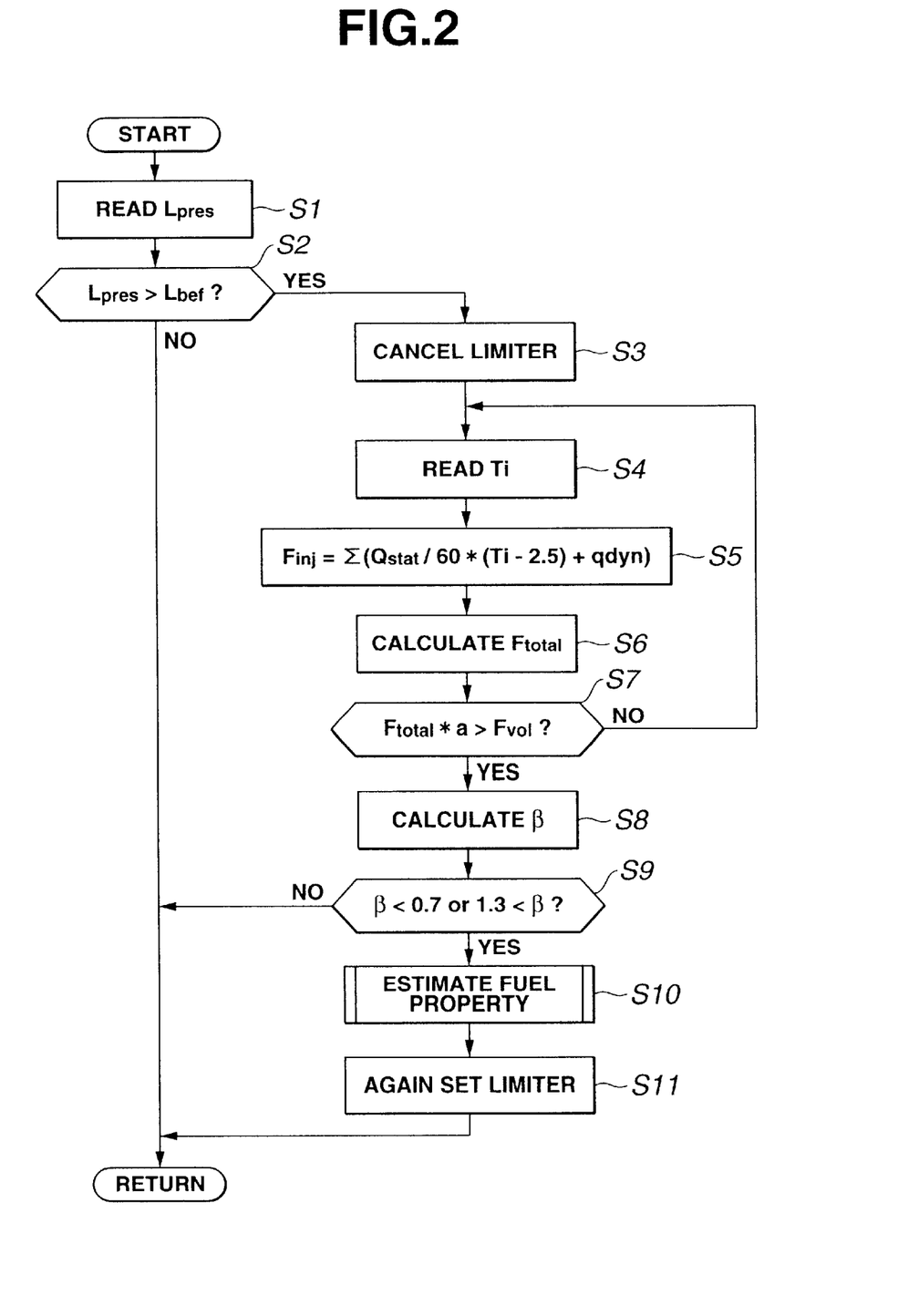
FIG. 2 is a flowchart showing a fuel property estimating routine executed by the fuel injection control system according to the present invention.

At step S1 of FIG. 2, ECU 20 reads a fuel level $L_{pres}$ indicative of a fuel residual quantity on the basis of a detection signal Fq of level gage 13. ECU 20 stores this fuel level $L_{pres}$ even after engine 1 is stopped, and when engine 1 is restarted, ECU 20 reads this stored fuel level $L_{pres}$ as $L_{bef}$.

At step S2, ECU 20 determines whether or not a refueling to the vehicle is executed. More specifically, ECU 20 newly reads fuel level $L_{pres}$ and compares the newly read fuel level $L_{pres}$ with the stored value $L_{bef}$. When the determination at step S2 is affirmative, that is, when $L_{pres} > L_{bef}$, ECU 20 determines that refueling was executed, and the routine proceeds to step S3. When the determination at step S2 is negative, that is, when $L_{pres} \leq L_{bef}$, ECU 20 determines that no refueling is executed. Therefore, the routine jumps to a return step to terminate the present routine. That is, when no refueling is executed, ECU 20 determines that a fuel property, particularly an alcohol concentration Ca of the fuel is not changed. This determination is based on a concept that such an increase of fuel level $L_{pres}$ is caused by refueling.

At step S3 subsequent to the affirmative determination at step S2, ECU 20 cancels a limiter for setting a limit condition of a correction of a fuel injection quantity. ECU 20 may employ other method for substantially cancel the limit condition by sufficiently expanding the correction allowable range. More specifically, the expanded correction allowable range generally corresponds to a range of ±70% since there is a possibility the fuel injection quantity is varied within a range ±70% according to the variation of alcohol concentration in fuel. This step S3 functions as limit condition canceling means.

At step S4, ECU 20 reads an output injection pulse width Ti which is outputted to fuel injector 4 to actually output an output fuel injection quantity. This output injection pulse width Ti indicative of the output fuel injection quantity is calculated on the basis of the operating condition of the engine.

In order to converge the combustion air-fuel ratio at a stoichiometric ratio, output injection pulse width Ti is corrected by a learning method and a feedback method on the basis of the detection signal Vs of oxygen sensor 12. After refueling, that is, when alcohol concentration Ca of the fuel is largely varied, ECU 20 requests to largely correct alcohol concentration Ca in the fuel injection control. Since the limiter has been canceled at step S3 in reply to refueling, it is possible to achieve the stoichiometric ratio without being limited by the limiter. For example, assuming that pure gasoline is changed to alcohol blend fuel having an alcohol concentration Ca of 85% by executing a refueling, there is a possibility that it is necessary to increase the fuel injection quantity to 160%. Herein, if the upper limit of the correction allowable range is 140%, the excess of 20% cannot be injected and therefore the emission thereof is degraded. In contrast, according to the present invention, it becomes possible to adapt the fuel injection quantity to the increase request. This enables three-way catalyst 6 to effectively perform so as to prevent exhaust gas including harmful substances from being released into the atmosphere.

At step S5, ECU 20 calculates a summed fuel injection quantity $F_{inj}$, which is a sum of fuel injection quantity of each fuel injector 4 during a period from the refueling to a present time by employing the following expression (3).

$$F_{inj}=\Sigma(Q_{stat}/60\times(Ti-2.5)+q_{dyn}), \quad (3)$$

where $Q_{stat}$ is a static fuel injection quantity, and $q_{dyn}$ is a dynamic fuel injection quantity.

At step S6, ECU 20 calculates a total fuel injection quantity $F_{total}$ by multiplying fuel injection quantity summed quantity $F_{inj}$ and the number n of cylinders of engine body 1 ($F_{total}=F_{inj}\times n$).

At step S7, ECU 20 determines whether or not the total fuel injection quantity $F_{total}$ becomes greater than a predetermined quantity $F_{vol}$. It may be assumed that the refueled fuel is equally stirred with a remaining fuel in a fuel tank by a fuel filling operation and a traveling of the vehicle. However, if a return-less type fuel injection system, which does not return the supplied fuel, is employed in the fuel injection system (fuel supply line), it takes a predetermined time period until the fuel of a new composition reaches fuel injector 4. This time delay depends on a volumetric capacity $F_{vol}$ of the fuel line. This volumetric capacity $F_{vol}$ is uniquely defined from the design of the engine. Accordingly, when total fuel injection quantity $F_{total}$ becomes greater than the capacity $F_{vol}$ after refueling, it is determined that the new fuel reached fuel injector 4. Further, by multiplying total fuel injection quantity $F_{total}$ by a safety factor a, and by comparing $F_{total}\times a$ with $F_{vol}$, this determination is further firmly executed. Accordingly, when it is determined that $F_{total}\times a$ is greater than $F_{vol}$, that is, when the determination at step S7 is affirmative, the routine proceeds to step S8. When $F_{total}\times a$ is smaller than or equal to $F_{vol}$, that is, when the determination at step S7 is negative, the routine returns to step S4 to repeat steps S4 through S7 until the determination at step S7 becomes affirmative.

At step S8, ECU 20 calculates a correction ratio β ($β=Ti/Ti_{bef}$) from the output injection pulse width Ti indicative of the output fuel injection quantity and the previous fuel injection quantity indicative pulse width $Ti_{bef}$ which has been employed before the refueling. Output injection pulse width Ti read at step S4 is obtained as a result that the setting of the limiter is cancelled so as to converge the air-fuel ratio into the stoichiometric air-fuel ratio.

At step S9, ECU 20 determines whether correction ratio β is smaller than a lower limit βmin such as 0.7 or whether correction ratio β is greater than βmax such as 1.3. When correction ratio β is smaller than 0.7 or greater than 1.3, that is, when it is determined that a percentage of the correction ratio β becomes greater than 30%, the routine proceeds to step S10 even if the fuel property is changed by the refueling of fuel having a different alcohol concentration Ca. On the other hand, when correction ratio β is within a range from the lower limit 0.7 to the upper limit 1.3, ECU 20 determines that there is no change of the fuel property. Therefore, the routine proceeds to the return step to terminate the present routine.

In this processing, steps S1, S2, S8 and S9 function as fuel property detecting means.

Figure 3:
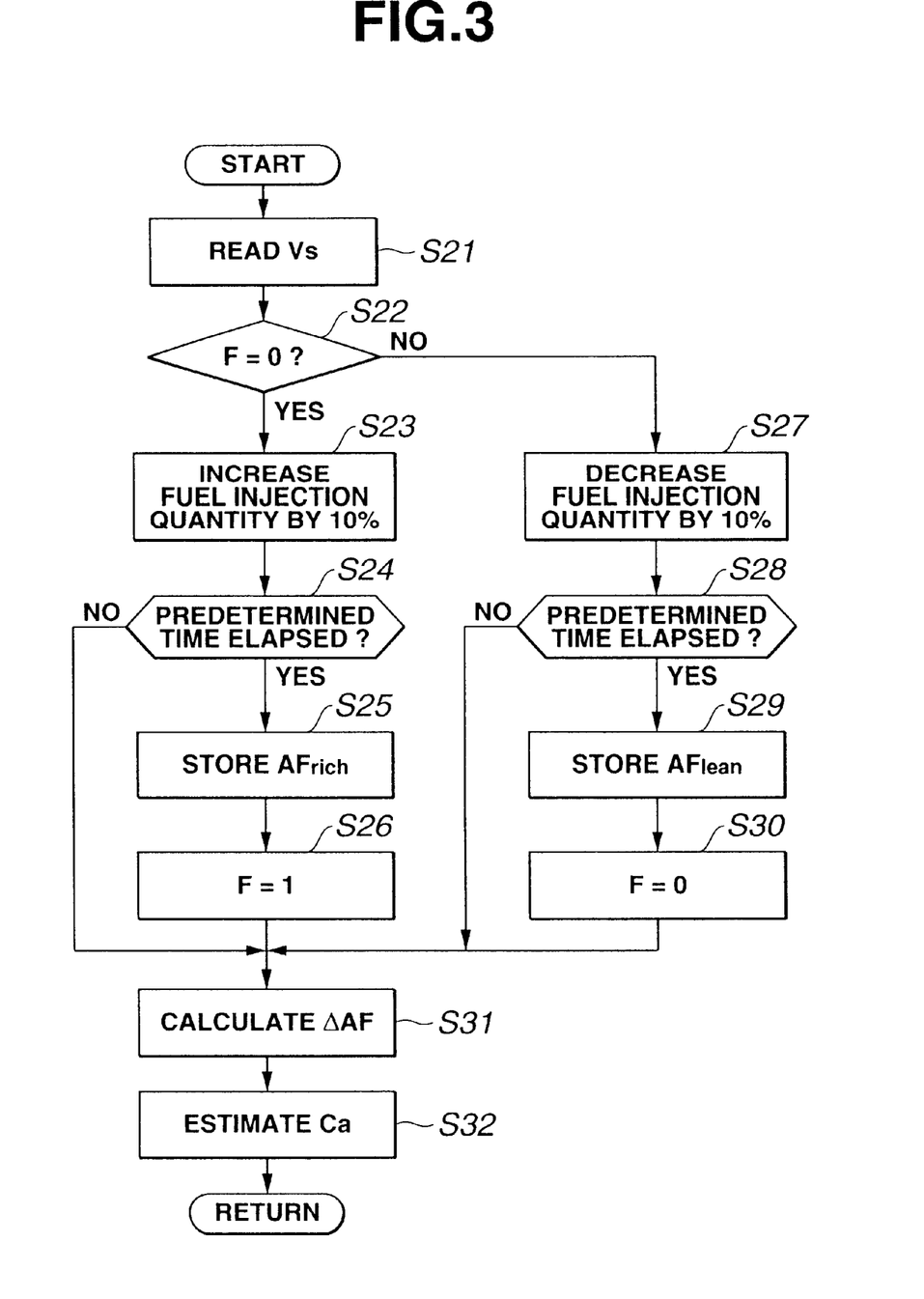
FIG. 3 is a flowchart showing a detailed estimation process executed at step S10 in FIG. 2.

At step S10 subsequent to the affirmative determination at step S9, ECU 20 estimates alcohol concentration Ca of the fuel as a present fuel property by executing a routine represented by a flowchart of FIG. 3.

At step S11, ECU 20 again sets the limiter relating the fuel injection quantity, on the basis of the estimated alcohol concentration Ca. More specifically, a median of the correction allowable range is offset by a quantity corresponding to the change of the alcohol concentration Ca of the fuel to prevent an abnormal operation from being generated by the limiter and to execute a troubleshooting regarding aging degradation. This step S11 functions as limit condition reconfiguration means.

The alcohol concentration Ca of the fuel is feedbacked to the fuel injection quantity calculation routine. Since a heat value of alcohol is smaller than that of gasoline, the fuel injection quantity is increased as the alcohol concentration Ca of the fuel increases.

With reference to the flowchart of FIG. 3, the fuel-property estimation process executed at step S10 of FIG. 2 will be discussed.

At step S21, ECU 20 reads an air-fuel ratio A/F of exhaust gas on the basis of the detection signal Vs of oxygen sensor 12. In this embodiment, in order to estimate alcohol concentration Ca of the fuel, the fuel injection quantity is temporally varied by executing the following steps of the flowchart of FIG. 3 so as to alternately vary the air-fuel ratio from the stoichiometric air-fuel ratio to rich or lean side. This flowchart of FIG. 3 functions as fuel property estimating means (alcohol concentration estimating means).

At step S22, ECU 20 determines whether a flag F is reset at 0 or not. When the determination at step S22 is affirmative (F=0), the routine proceeds to step S23 wherein the fuel injection quantity is increased by 10% (Ti=Tp×α×1.1+Ts). Then, the routine proceeds to step S24 wherein ECU 20 determines whether or not a predetermined time is elapsed. When the determination at step S24 is affirmative, the routine proceeds to step S25. When the determination at step S24 is negative, the routine jumps to step S31. That is, until the predetermined time is elapsed, the quantity-increased fuel injection is continued. At step S25 subsequent to the affirmative determination at step S24, ECU 20 stores the present air-fuel ratio AF as $AF_{rich}$. Then, the routine proceeds to step S26 wherein flag F is set at 1 (F=1).

On the other hand, when the determination at step S22 is negative (F=1), the routine proceeds to step S27 wherein the fuel injection quantity is decreased by 10% (Ti=Tp×α×0.9+Ts). Then, the routine proceeds to step S28 wherein ECU 20 determines whether or not the predetermined time is elapsed. When the determination at step S28 is affirmative, the routine proceeds to step S29. When the determination at step S28 is negative, the routine jumps to step S31. That is, until the predetermined time is elapsed, the quantity-decreased fuel injection is continued. At step S29 subsequent to the affirmative determination at step S28, ECU 20 stores the present air-fuel ratio AF as $AF_{lean}$. Then, the routine proceeds to step 30 wherein flag F is reset at 0 (F=0).

At step S31 subsequent to the execution of step S26 or S30, or the negative determination at step S24 or S28, ECU 20 calculates an air-fuel ratio variation ΔAF ($\Delta AF=AF_{lean}-AF_{rich}$), on the basis of the detected air-fuel ratios $AF_{rich}$ and $AF_{lean}$.

At step S32, ECU 20 estimates alcohol concentration Ca of the fuel on the basis of air-fuel ratio variation ΔAF and with reference to a map. In order to further accurately estimate alcohol concentration Ca, it is preferable to take account of an engine operating condition which includes the water temperature Tw, an intake air temperature, engine speed Ne, a load and aging factor. That is because the vaporization characteristic of the fuel attached on a wall of the intake manifold is influenced by a condition of the wall of the intake manifold such as a temperature, a degree of dirtiness and a flow of the intake air.

Figure 4:
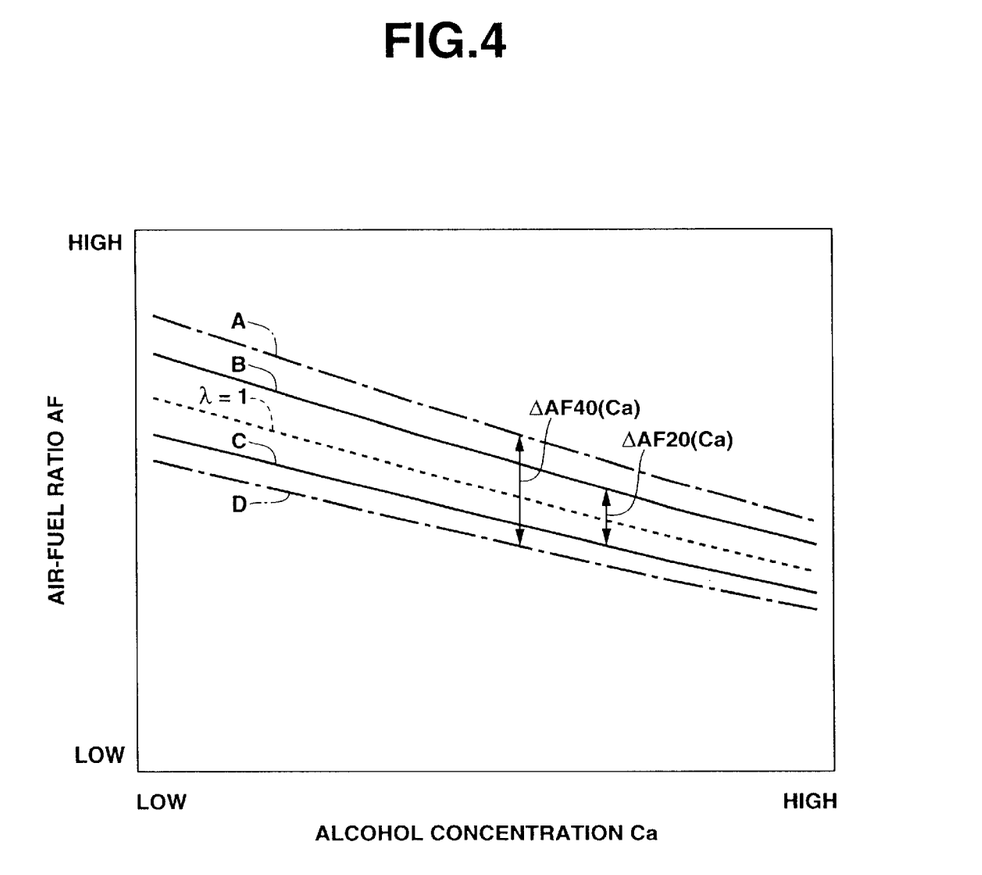
FIG. 4 is a graph showing a characteristic line of an air-fuel ratio variation with respect to an increased quantity of the fuel injection quantity.
Figure 5:
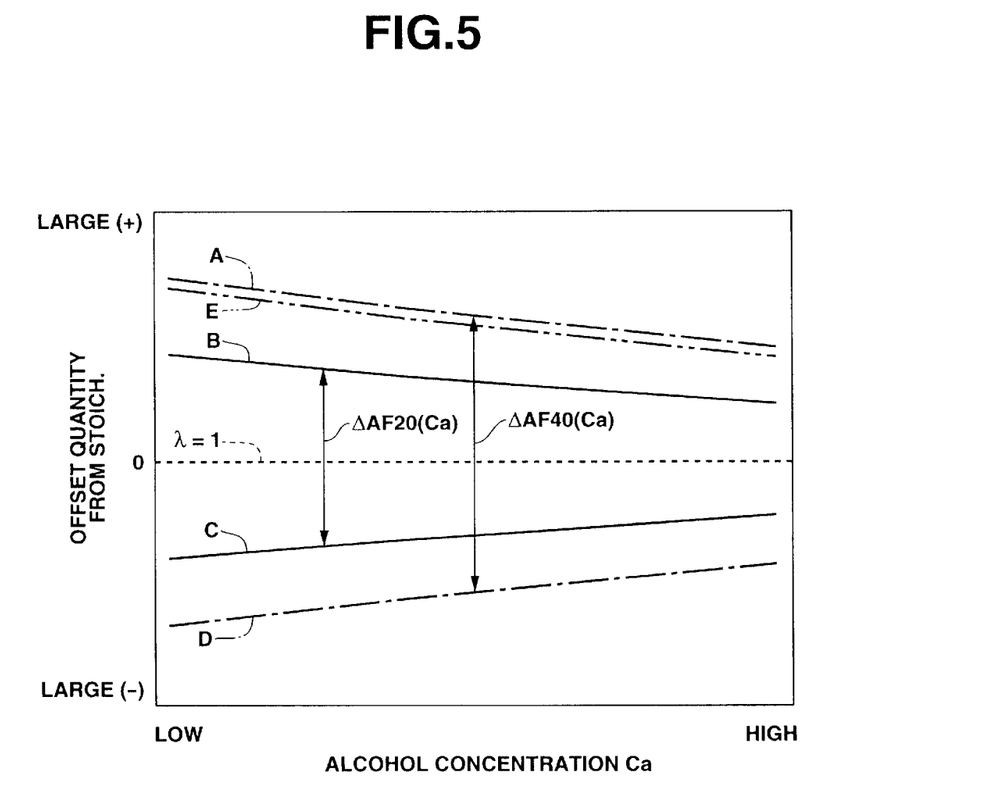
FIG. 5 is a graph showing characteristic lines of the air-fuel ratio variation relative to a stoichiometric air-fuel ratio state ($\lambda=1$ condition).

With reference to graphs shown in FIGS. 4 and 5, the fuel property estimation of the embodiment with be discussed.

The graph of FIG. 4 shows a relationship between the stoichiometric air-fuel ratio and alcohol concentration Ca of the fuel, and variations of the air-fuel ratio in the event that the fuel injection quantity is increased or decreased by the predetermined quantity during the stoichiometric air-fuel ratio operation (Line $\lambda=1$, lines A through D).

A stoichiometric air-fuel ratio of alcohol is different from a stoichiometric air-fuel ratio of gasoline. Therefore, the variation of the air-fuel ratio, which is caused by increasing or decreasing the fuel injection quantity by a predetermined quantity from the condition $\lambda=1$, varies according to alcohol concentration Ca of the fuel. In FIG. 4, line A shows a case that the fuel injection quantity is decreased by 20%, line B shows a case that the fuel injection quantity is decreased by 10%, line C shows a case that the fuel injection quantity is increased by 10%, and line D shows a case that the fuel injection quantity is increased by 20%.

As is clear from FIG. 4, the stoichiometric air-fuel ratio decreases according to the increase of alcohol concentration Ca. Further, a variation of the air-fuel ratio AF of each line A, B, C, D decreases according to the increase of alcohol concentration Ca. For example, line C gradually approaches a broken line indicative of the condition $\lambda=1$ according to the increase of alcohol concentration Ca. That is, the variation of the air-fuel ratio of line C gradually decreases according to the increase of alcohol concentration Ca.

From this relationship, it becomes possible to treat the variation of the air-fuel ratio AF as a parameter and to estimate the alcohol concentration Ca thereby.

FIG. 5 shows a relationship between the alcohol concentration and a variation of the air-fuel ratio according to the variation of the fuel injection quantity under the stoichiometric operation. References A through D in FIG. 5 correspond to those in FIG. 4.

This embodiment according to the present invention is arranged to increase and decrease the fuel injection quantity of the condition $\lambda=1$ by a predetermined rate when the estimation of alcohol concentration Ca of the fuel is executed. Accordingly, the air-fuel ratio variation ΔAF calculated at step S31 is a difference between lines B and C and corresponds to a quantity represented by ΔAF20(Ca) in FIG. 5. By alternately varying air-fuel ratio AF from the condition $\lambda=1$ to the lean side and the rich side, it becomes possible to obtain the variation ΔAF for estimating the alcohol concentration while suppressing the offset from the stoichiometric air-fuel ratio, as compared with the case that air-fuel ratio AF is varied only one of the lean side and the rich side. This arrangement further suppresses the degradation of the emission during the estimating operation.

The magnitude of the variation of the fuel injection quantity may not be limited to 10%. For example, if the fuel injection quantity of the condition $\lambda=1$ is increased and decreased by 20% for the estimation of alcohol concentration Ca, the air-fuel ratio variation ΔAF becomes greater than ΔAF20(Ca) and takes a value corresponding to ΔAF40(Ca) in FIG. 5. Furthermore, such the alternate increase and decrease of the fuel injection quantity may be executed several times to further accurately estimate the alcohol concentration Ca.

Figure 6:
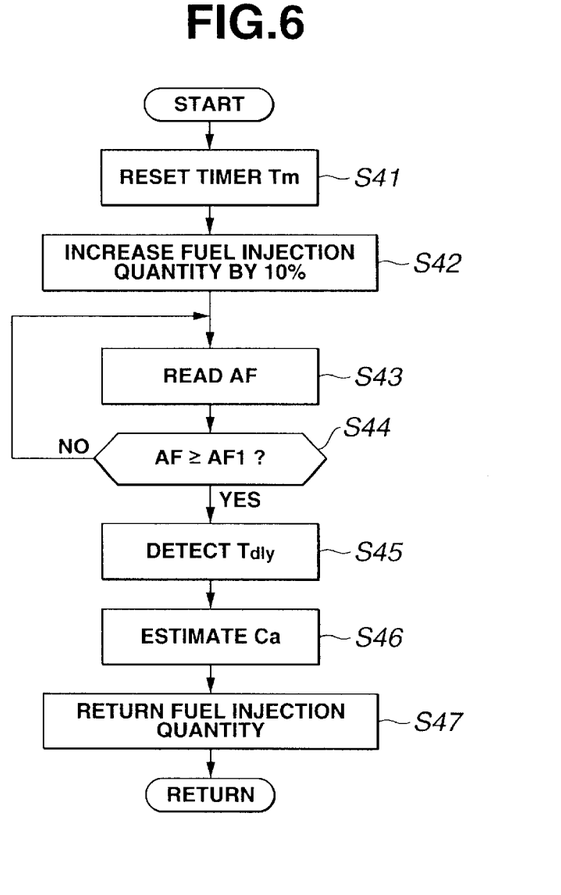
FIG. 6 is a flowchart showing another estimation process employed in a second embodiment according to the present invention.
Figure 7:
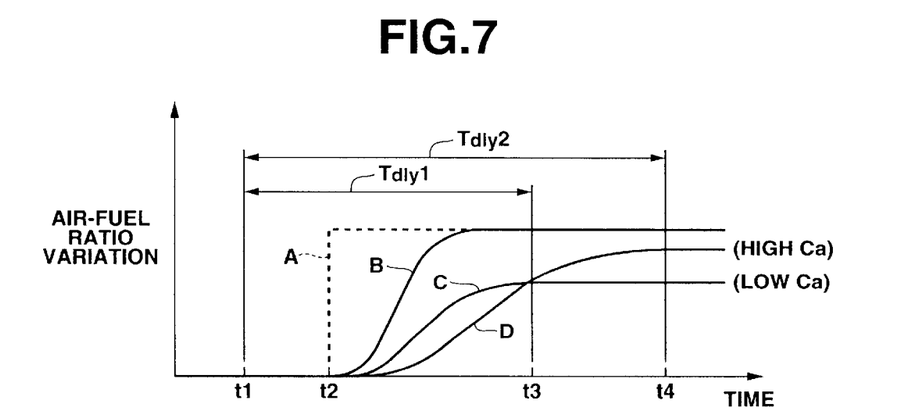
FIG. 7 is a graph showing response characteristic curves of the air-fuel ratio according to the increase of the fuel injection quantity.

Referring to FIGS. 6 and 7, there is shown a second embodiment of the fuel injection control system according to the present invention. The second embodiment is basically the same as the first embodiment except that a flowchart of FIG. 6 is employed instead of the flowchart of FIG. 3. That is, the construction of the engine system and the control system thereof in the second embodiment is the same as that shown in FIG. 1. Further, the flowchart of FIG. 2 is directly employed in the second embodiment.

At step S41 in FIG. 6, ECU 20 resets timer Tm (Tm=0).

At step S42, ECU 20 increases the fuel injection quantity by a predetermined rate such as 10% in this embodiment.

At step S43, ECU 20 reads air-fuel ratio AF on the basis of the detection signal of oxygen sensor 12.

At step S44, ECU 20 determines whether or not air-fuel ratio AF is varied according to the increases of the fuel injection quantity by comparing the read air-fuel ratio AF with a stored value AF1. When the determination at step S44 is negative, the routine returns to step S43. That is, until the determination at step S44 turns affirmative, the routine repeats steps S43 and S44. When the determination at step S44 becomes affirmative, the routine proceeds to step S45.

At step S45, ECU 20 detects a response delay time $T_{dly}$ between a moment of increasing the fuel injection quantity and a moment of the affirmative determination at step S44.

At step S46, ECU 20 estimates alcohol concentration Ca from a map stored in ECU 20 on the basis of the response delay time $T_{dly}$.

At step S47, ECU 20 returns the fuel injection quantity to its original state.

In this second embodiment, steps S41 through S46 function as fuel property estimating means.

With reference to a time chart of FIG. 7, the fuel property estimation of the second embodiment will be further discussed.

FIG. 7 shows a change of an absolute value of air-fuel variation ΔAF with respect to time in case that the fuel injection quantity is increased by a predetermined rate during the stoichiometric air-fuel ratio operation ($\lambda=1$ condition). In FIG. 7, curve A shows a performance in the event that alcohol concentration Ca is zero (Ca=0) and on an assumption that there is no response delay due to the vaporization of the fuel. Curve B shows a performance in the event that alcohol concentration Ca is zero (Ca=0) and on an assumption that there is a response delay due to the vaporization of the fuel. Curve C shows a performance in the event that alcohol concentration Ca is relatively low and on an assumption that there is the response delay due to the vaporization of the fuel. Curve D shows a performance in the event that alcohol concentration Ca is relatively high and on an assumption that there is the response delay due to the vaporization of the fuel.

Since the heat of vaporization of alcohol is greater than that of gasoline, the time, in which the fuel attached on an inner wall of the intake manifold is vaporized and supplied to each combustion chamber, increases according to the increase of alcohol concentration Ca.

When it is assumed that the fuel injection quantity is increased at a moment t1 in FIG. 7, the output of oxygen sensor 12, indicative of the performance of the air-fuel ratio AF after the fuel injection quantity is increased, includes a transfer delay (a period from moment t1 to moment t2) and the response delay due to the vaporization. In case of curve C of a low alcohol concentration Ca, the response delay thereof is short as compared with the response delay of curve D of a high alcohol concentration Ca, and therefore the response delay time $T_{dly}$ caused after the fuel injection quantity is increased (moment t1) is also short. That is, the response delay time $T_{dly1}$ of curve C of the low alcohol concentration Ca is shorter than the response delay time $T_{dly2}$ of curve D of the high alcohol concentration Ca ($T_{dly1}<T_{dly2}$), as is clearly shown in FIG. 7. Further, it is apparent that the response delay in each case is longer than that in a case that pure gasoline without alcohol is employed. That is, since the response delay time $T_{dly}$ varies according to alcohol concentration Ca, it is possible to estimate the fuel property (alcohol concentration) by employing the response delay time $T_{dly}$ as a parameter.

With this second embodiment according to the present invention, the alcohol concentration Ca of the fuel is estimated on the basis of the vaporization characteristic of the fuel. Accordingly, in the event that components in the alcohol blended fuel except for alcohol is very heavy, there is a possibility that alcohol concentration Ca is estimated at a value higher than an actual value. However, this possibility is eliminated by estimating the alcohol concentration Ca on the basis of the air-fuel ratio variation employed in the first embodiment so as to ensure a high reliability in this estimation.

Although the first embodiment according to the present invention has been shown and described such that the refueling is detected on the basis of fuel level $L_{pres}$, it will be understood that other method may be employed to detect the refueling. For example, the refueling may be detected by providing an open/close detection switch at a fuel filler lid and by detecting a detection signal of this open/close detection switch.

This application is based on Japanese Patent Application No. 2001-316795 filed on Oct. 15, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A fuel injection control system of an internal combustion engine, comprising:
   a control unit configured,
      to calculate a basic fuel injection quantity from an engine operating condition,
      to calculate an output fuel injection quantity by correcting the basic fuel injection quantity so as to bring an actual air-fuel ratio closer to a target air-fuel ratio adapted to the engine operating condition,
      to detect whether a fuel property of fuel for the internal combustion engine is varied,
      to expand a correction allowable range employed in correcting the basic fuel injection quantity when the fuel property is varied, and
      to estimate the fuel property by temporally varying the output fuel injection quantity after the correction allowable range is expanded and by detecting a behavior of the air-fuel ratio after the output fuel injection quantity is varied.

2. The fuel injection control system as claimed in claim 1, further comprising an engine condition detecting device that detects an operating condition of the internal combustion engine and outputs a signal indicative of the operating condition, wherein the control unit detects the engine operating condition on the basis of the signal.

3. The fuel injection control system as claimed in claim 1, wherein expanding the correction allowable range includes canceling a limit condition for limiting a correction range of the output fuel injection quantity.

4. The fuel injection control system as claimed in claim 1, wherein the control unit is further configured to reset the correction allowable range on the basis of the estimated fuel property.

5. The fuel injection control system as claimed in claim 1, wherein the control unit is configured to calculate the output fuel injection quantity upon taking account of the estimated fuel property.

6. The fuel injection control system as claimed in claim 1, wherein the fuel property is an alcohol concentration of the fuel when alcohol blended fuel is employed as fuel.

7. The fuel injection control system as claimed in claim 1, wherein the control unit is configured to detect that the fuel property is varied when refueling is executed.

8. The fuel injection control system as claimed in claim 7, wherein the control unit is configured to detect the refueling on the basis of an open/close operation of a fuel filler lid of the vehicle.

9. The fuel injection control system as claimed in claim 7, wherein the control unit is configured to detect the refueling on the basis of a change of a fuel residual quantity in a fuel tank.

10. The fuel injection control system as claimed in claim 7, wherein the control unit is configured to estimate the fuel property by varying the output fuel injection quantity after the refueled fuel is injected in the internal combustion engine.

11. The fuel injection control system as claimed in claim 1, wherein the control unit is configured to estimate the fuel property on the basis of a response delay time from a moment of the change of the fuel injection quantity to a moment that the air-fuel ratio detected in an exhaust passage performs a predetermined behavior.

12. The fuel injection control system as claimed in claim 1, wherein the control unit is configured to estimate the fuel property on the basis of a variation of the air-fuel ratio caused by the change of the output fuel injection quantity.

13. The fuel injection control system as claimed in claim 1, wherein the control unit alternately increase and decrease the output fuel injection quantity so that the actual air-fuel ratio is alternately varied to a rich side and a lean side with respect to the target air-fuel ratio.

14. The fuel injection control system as claimed in claim 1, wherein the control unit is configured to correct the fuel property according to the engine operating condition.

15. A fuel injection control system for an internal combustion engine, comprising:
   a control unit configured,
      to calculate a basic fuel injection quantity from an engine operating condition,
      to calculate an output fuel injection quantity by correcting the basic fuel injection quantity so as to bring an actual air-fuel ratio into a target air-fuel ratio adapted to the engine operating condition,
      to detect whether refueling is executed,
      to expand a correction allowable range employed in correcting the basic fuel injection quantity when the refueling is detected,
      to estimate a fuel property of fuel injected into the internal combustion engine after the correction allowable range is expanded, and
      to set the correction allowable range on the basis of the estimated fuel property.

16. A method of executing a fuel injection control of an internal combustion engine, comprising:
   calculating a basic fuel injection quantity from an engine operating condition;
   calculating an output fuel injection quantity to bring an actual air-fuel ratio closer to a target air-fuel ratio adapted to the engine operating condition by correcting the basic fuel injection quantity;
   detecting whether a fuel property of fuel for the internal combustion engine is varied;
   expanding a correction allowable range employed in correcting the basic fuel injection quantity when the fuel property is varied; and estimating the fuel property by temporally varying the output fuel injection quantity after the correction allowable range is expanded and by detecting a behavior of the air-fuel ratio after the output fuel injection quantity is varied.

17. A fuel injection control system for an internal combustion engine, comprising:

basic fuel injection quantity calculating means for calculating a basic fuel injection quantity from an engine operating condition;

fuel injection quantity correcting means for calculating an output fuel injection quantity to bring an actual air-fuel ratio closer to a target air-fuel ratio adapted to the engine operating condition by correcting the basic fuel injection quantity;

fuel property change detecting means for detecting whether a fuel property of fuel for the internal combustion engine is varied;

limit condition canceling means for expanding a correction allowable range employed in correcting the basic fuel injection quantity when the fuel property is varied; and fuel property estimating means for estimating the fuel property by temporally varying the output fuel injection quantity after the correction allowable range is expanded and by detecting a behavior of the air-fuel ratio after the output fuel injection quantity is varied.

* * * * *